(12) United States Patent
Berko et al.

(10) Patent No.: US 12,026,204 B2
(45) Date of Patent: Jul. 2, 2024

(54) AUTOMATIC INCIDENT DISPATCHER

(71) Applicant: Acronis International GmbH, Schaffhausen (CH)

(72) Inventors: Nickolay Berko, Schaffhausen (CH); Serg Bell, Singapore (SG); Stanislav Protasov, Singapore (SG)

(73) Assignee: Acronis International GmbH, Schaffhausen (CH)

( * ) Notice: Subject to any disclaimer, the term of this patent is extended or adjusted under 35 U.S.C. 154(b) by 85 days.

(21) Appl. No.: 17/804,829

(22) Filed: May 31, 2022

(65) Prior Publication Data
US 2023/0385342 A1 Nov. 30, 2023

(51) Int. Cl.
*G06F 16/906* (2019.01)

(52) U.S. Cl.
CPC ................... *G06F 16/906* (2019.01)

(58) Field of Classification Search
CPC .................................... G06F 16/906
USPC ........................................ 707/738
See application file for complete search history.

(56) References Cited

U.S. PATENT DOCUMENTS

| | | |
|---|---|---|
| 7,571,146 B2 | 8/2009 | Dalton |
| 8,779,921 B1 | 7/2014 | Curtiss |
| 9,432,430 B1 | 8/2016 | Klenz |
| 9,953,226 B2 | 4/2018 | Midavaine et al. |
| 10,242,187 B1 | 3/2019 | Roundy et al. |
| 10,419,466 B2 | 9/2019 | Ferguson |
| 10,586,036 B2 | 3/2020 | Turgeman |
| 10,721,266 B1 * | 7/2020 | Herman-Saffar ... H04L 63/1441 |
| 10,902,114 B1 * | 1/2021 | Trost ........................ G06F 16/26 |
| 10,963,562 B2 | 3/2021 | Kamiya et al. |
| 11,095,722 B2 | 8/2021 | Kursun |
| 11,250,126 B2 | 2/2022 | Strogov et al. |
| 11,403,389 B2 | 8/2022 | Karasev et al. |
| 11,483,327 B2 * | 10/2022 | Hen .................... G06F 21/6218 |
| 2007/0255818 A1 | 11/2007 | Tanzer et al. |
| 2013/0111586 A1 | 5/2013 | Jackson |
| 2016/0196174 A1 * | 7/2016 | Jacob .................... G06F 11/079 714/37 |
| 2017/0024745 A1 | 1/2017 | Brew et al. |

(Continued)

FOREIGN PATENT DOCUMENTS

| | | |
|---|---|---|
| JP | 2019153279 A | 9/2019 |
| WO | 2006071985 A2 | 7/2006 |
| WO | 2014004721 A1 | 1/2014 |

OTHER PUBLICATIONS

Zhou, Wubai, et al., "Resolution Recommendation for Event Tickets in Service Management", IEEE Transactions on Network and Service Management, vol. 13, No. 4, Dec. 2016, pp. 954-967.*
Xu, Jian, et al., "A multi-view similarity measure framework for trouble ticket mining", Data & Knowledge Engineering, vol. 127, May 2020, pp. 1-17.*
Marcu, Patricia, et al., "Towards an Optimized Model of Incident Ticket Correlation", INM 2009, New York, NY, Jun. 1-5, 2009, pp. 569-576.*

(Continued)

*Primary Examiner* — Robert Stevens
(74) *Attorney, Agent, or Firm* — ESPE Legal Consultancy FZ-LLC

(57) ABSTRACT

An automatic incident dispatcher calculates an incident signature of a new incident, calculates a degree of variance (DoV) of the new incident from an incident signature of the previously classified incident, compares the calculated DoV to a predetermined threshold, and determines that the new incident belongs to a same class as a class of the previously classified the new incident if the calculated DoV is less than or equal to the threshold.

16 Claims, 3 Drawing Sheets

(56) References Cited

U.S. PATENT DOCUMENTS

| | | | |
|---|---|---|---|
| 2017/0160734 A1* | 6/2017 | Masse | G05B 23/0235 |
| 2017/0279616 A1 | 9/2017 | Loeb et al. | |
| 2017/0366582 A1* | 12/2017 | Kothekar | H04L 63/1425 |
| 2021/0150026 A1* | 5/2021 | Satish | G06Q 10/06316 |
| 2021/0255613 A1* | 8/2021 | Mizobuchi | G01H 17/00 |
| 2022/0159034 A1* | 5/2022 | Volkov | G06F 21/53 |
| 2022/0263731 A1* | 8/2022 | Gupta | G06F 40/289 |
| 2022/0391279 A1* | 12/2022 | Grigoryan | G06F 11/0757 |
| 2023/0096108 A1 | 3/2023 | Malanov et al. | |
| 2023/0128837 A1* | 4/2023 | Hu | G06F 11/3447 718/104 |
| 2023/0388321 A1* | 11/2023 | Berko | H04L 63/1416 |

OTHER PUBLICATIONS

Xu, Jian, et al., "Signature based trouble ticket classification", Future Generation Computer Systems, vol. 78, Part 1, Jan. 2018, pp. 41-58.*

Muni, Durga Prasad, et al., "Recommending resolutions of ITIL services tickets using Deep Neural Network", IKDD CODS 2017, Chennai, India, Mar. 9-11, 2017, Article No. 14, pp. 1-10.*

Rosli, Nur Adibah, et al., "Clustering Analysis for Malware Behavior Detection using Registry Data", International Journal of Advanced Computer Science and Applications, vol. 10, No. 12, 2019, pp. 93-102.*

Skopik, Florian, et al., "Establishing National Cyber Situational Awareness through Incident Informational Clustering", CyberSA 2015, London, UK, Jun. 8-9, 2015, 8 pages.*

\* cited by examiner

AUTOMATIC INCIDENT DISPATCHER

TECHNICAL FIELD

The present invention pertains to computer systems and protection of data on these computer systems from loss from actions caused by people or events, such as threat agents and threat events.

BACKGROUND

Computer systems rely in their functionality on different types of data that include but are not limited to operating system (OS), applications, application settings, files (contents and metadata), data in transit (e.g., part of network traffic), data in computer memory (e.g., application variables and clipboard), and databases or other data storages.

Information security (INFOSEC) systems are designed for keeping information confidential, available, and assuring its integrity.

A specific subclass of INFOSEC systems are Data Loss Prevention (DLP) systems that enforce information (1) storage and (2) transfer rules.

First, DLP systems enforce the storage rules demanding that certain types of information are stored only in approved locations and may take steps in case such systems detect certain information in an unauthorized location.

Second, DLP systems make sure that information may only be transmitted by a sender who has permission to send such information to a receiver who has permission to receive such information from the sender.

DLP systems deploy various controls including preventive (e.g., user authorization and authentication), detective (e.g., controls designed to detect attacks, errors or irregularities), and corrective (e.g., controls designed to mitigate attacks, correct errors or irregularities). Currently, DLP systems use pre-defined by a vendor or manually configured sets of rules that govern their controls.

Computer systems may include on individual devices (nodes) that use networks to communicate between themselves. Some of these devices are computers, network routers, intrusion detection systems, network attached storage (NAS) devices, USB Flash Drives, etc.

Computer systems utilize a notion of "users" to denote individual people and applications (e.g., service accounts) to describe permissions and track actions within these systems.

DLPs analyze computer systems and network traffic to detect potential malicious actions by threat agents or threat events. These systems may determine that a combination of certain events indicate a potential malicious action (an "incident").

In some cases, incidents are identified when the loss of data or other negative consequences have already happened.

Once an incident is identified, a pre-defined manually configured action may be taken or further investigation may be warranted. Classification of incidents and identification for controls necessary to address it may take a considerable amount of time and manual work that ultimately may lead to further losses.

Generally, configuration of a DLP system (1) is prone to errors due to human involvement, (2) involves manual work and hence carries additional cost, and (3) due to the necessity of manual interaction may be slow to react to changing a threat environment.

SUMMARY

This invention discloses a system and a method that allow for classification of incidents by comparing related data (incident signatures) to previously classified incidents or groups of incidents.

For example, if a new incident was detected that included a failed attempt to send unencrypted data followed by sending of encrypted data of comparable size, this invention compares that incident to other incidents, and if identifies other incidents with similar events (i.e., a failed attempt to send unencrypted data followed by sending of encrypted data of comparable size), then it makes a decision that the new incident should be classified in a similar way as the previously analyzed incident, e.g., as a potential data leakage incident.

Another example is sending an unusually large attachment to a message or moving an unusually large amount of data to a peripheral device (incidents comprising a single event). If such incidents have been previously investigated and classified, then these incidents will be classified by this invention the same way as previously investigated incidents of sending unusually large attachments to a message or moving an unusually large amount of data to a peripheral device respectively.

The third example is classifying an incident comprising sending proprietary information to an unauthorized sender listed in the CC field: if a similar incident has been previously classified as an inadvertent potential disclosure of protected data to an unauthorized person, this incident will be classified the same way by this invention.

The fourth example may be classifying an incident comprising sending proprietary information to an unauthorized sender listed in the BCC field: a similar incident may have been previously classified as a malicious attempt to disclose protected data to an unauthorized person.

The fifth example is forwarding of protected information from a corporate to a personal account. If a similar incident has been previously classified as a potential leakage, this incident will be classified by this invention the same way.

The sixth example is printing an unusually large amount of data. If previously, a similar incident has been classified as a malicious data leakage, this incident will be classified the same way by this invention.

The seventh example is discovered data leakage from a database. Then comparing events preceding this event, the system identified another "similar" incident that also consisted of several failed attempts at SQL injection followed by a successful leakage from a database at another software module. The previous incident was classified as an exploited SQL injection vulnerability. Because this invention determined that the incidents were similar, the system automatically classified the second incident as a SQL injection vulnerability exploit as well. Such determination was automatically reported to development as a critical error, scheduled for immediate fix and emergency release.

A similar example is related to increased vulnerability scanning (specifically—for version number of a certain piece of a popular third-party software) activity followed by successful penetration inside the protected perimeter. Once the new incident was reported, the system identified a similar incident classified as an unpatched version of a third-party product, also classified it as an unpatched version of the third-party product and raised a service ticket to the system admin to apply the patches immediately.

Overall, when a new incident is reported, the system automatically provides a record (a log or logs) of events leading to the incident or a user performing initial investigation may filter only the events that appear to be related to the incident. The invention analyzes this record and attempts to identify previously investigated incidents that are similar (according to some formalized criteria) to the current incident. Such similarity includes identification of similarities between subsets of events preceding both events. If sufficient similarity is discovered, then the newly identified event is categorized in the similar way as the previous event. Ideally, after the investigation, an incident only contains information about relevant events—events that were caused by or associated with the attack or naturally occurring phenomenon that resulted in the incident.

The data that is used to calculate these signatures may include events associated with the incident.

A degree of variance (DoV) function is predetermined that produces a numeric value indicating a difference between the two signatures. The DoV function may be such that for every incident A, $DoV(A,A)=0$. The DoV function may further be such that for every incident A, B, and C, the following is true: $DoV(A,B)+DoV(B,C)>=DoV(A,C)$.

Once the incident signature of a new incident is identified, it is compared to a catalog of previously classified incidents by calculating the DoV of these incidents.

A threshold is predetermined such that, if the DoV of two incidents is less (or equal) to that threshold, then two incidents are considered similar.

A new incident gets assigned to the same classification as all other events that are similar to the new event.

Given approach allows for certain optimizations.

The approach of the present invention also allows for discovery of new classifications by identification of clusters of events that have not been previously classified as a single class.

BRIEF DESCRIPTION OF DRAWINGS

The exemplary aspects of the invention will be better understood from the following detailed description of the exemplary embodiments of the invention with reference to the drawings.

DETAILED DESCRIPTION

Figure 1:
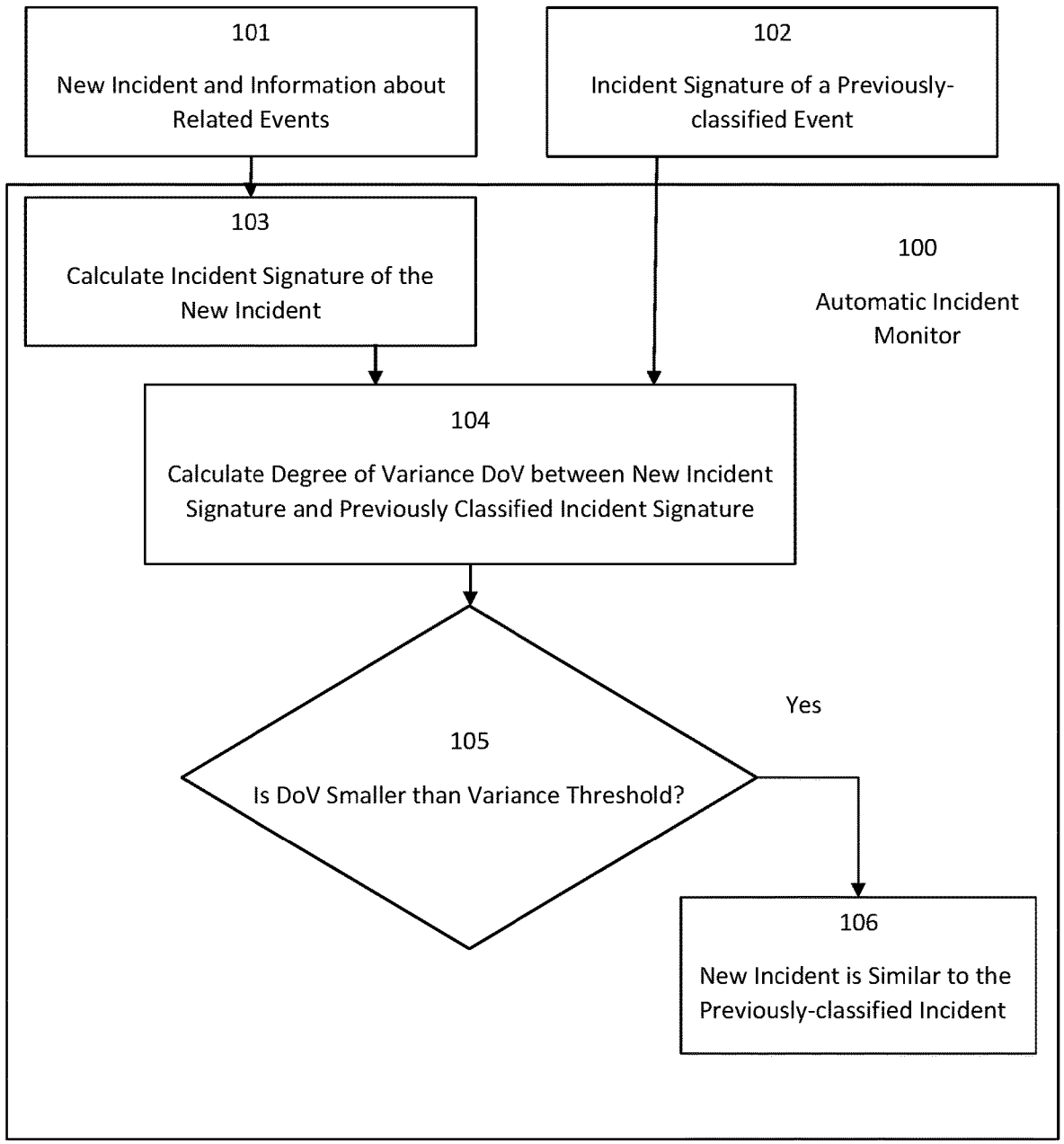
FIG. 1 shows an exemplary procedure for an operation of an automatic incident dispatcher according to an exemplary embodiment.

Automatic Incident Dispatcher (AID) is a system that automatically classifies an incident indicated by its subsystems or other system(s) using available information about (1) events related to the incident, (2) data about the computer system(s) related to the incident, and (3) external data related to the incident based on information of previously classified events.

Computer systems allow for monitoring of a large array of events (e.g., authentication, use of an application, visit of a website) as well as give access to a number of user-related data (e.g., position, age, etc.). Some of these events may be related to an incident by source, location, time, and other criteria.

The present invention creates an incident signature of an incident and compares it to a catalog of incident signatures of previously classified incidents or groups of previously similarly classified incidents. An example of such a signature may be a simple array (e.g., a vector) containing certain values representing observed events related to the incident or similarly classified incidents.

A distance or a degree of variance (DoV) is a function of any two incident signatures or between an incident signature and an incident group signature. An example of such a DoV may be a simple mathematical distance between two vectors representing incident signatures of these incidents or an incident and a group of incidents.

One or more thresholds are predetermined that are used to make decisions of whether the two incident signatures are similar or not.

When a new incident is compared to a list of classified incidents, once a previously classified incident is found with DoV between the two incident signatures that is less than the threshold, the new incident gets one or all of the classifications of the previously identified incident. Once the incident is classified, further comparison may continue to identify other similar previously classified incidents to determine all classifications that may apply to the incident.

When a new incident is compared to groups of previously classified incidents, in which each group representing a class, if an incident is found within a given group such that the DoV of the two incidents is less than the predetermined threshold, the new event becomes similarly classified, and no further searches within the group are performed. Additional similarly arranged comparisons may be performed with other groups of previously similarly situated groups.

Embodiments of the invention perform additional functions such as identification of new classes (e.g., intersections of previously created classes or clusters of incidents that have not been previously classified as one class).

Once an incident is classified, the AID may take an action or generate a message with information about the incident.

In an embodiment, the AID determines recommended controls including corrective actions (e.g., blocking an application, access restriction, user account deactivation, port blocking, type of traffic blocking, raising alarms, initiating fail-over to another resource, generating incident report, communicating incident report to relevant users, etc.) and/or detective actions (e.g., capturing screenshots, saving recent events, capturing contents of computer memory and/or network traffic, etc.) based on data related to the indicated incident.

In an embodiment such analysis is performed by applying predetermined heuristic rules, statistical analysis, a neural network, or support vector machines, for example, based on the information of known past incidents.

In an embodiment such analysis is followed by execution of identified controls.

FIG. 1 shows an exemplary procedure for an operation of an Automatic Incident Dispatcher (AID) (100) according to an exemplary embodiment.

At some point, AID (100) receives a new incident and information about events related to the new incident (101), and further receives incident signatures of a previously classified event (102).

AID (100) calculates the incident signature of the new incident (103).

AID (100) also gains access to an incident signature of a previously classified event (102), possibly from a collection (or a set) of previous incidents signatures.

Once both signatures are available, AID (100) calculates (104) a degree of variance (DoV) between the new incident signature (101) and the previously classified incident signature (102).

Then, AID (100) compared the DoV to a predetermined variance threshold (105). If the DoV is smaller (or smaller or equal) than the threshold, then AID (100) decides that the new incident is similar to the previously classified incident (106).

Figure 2:
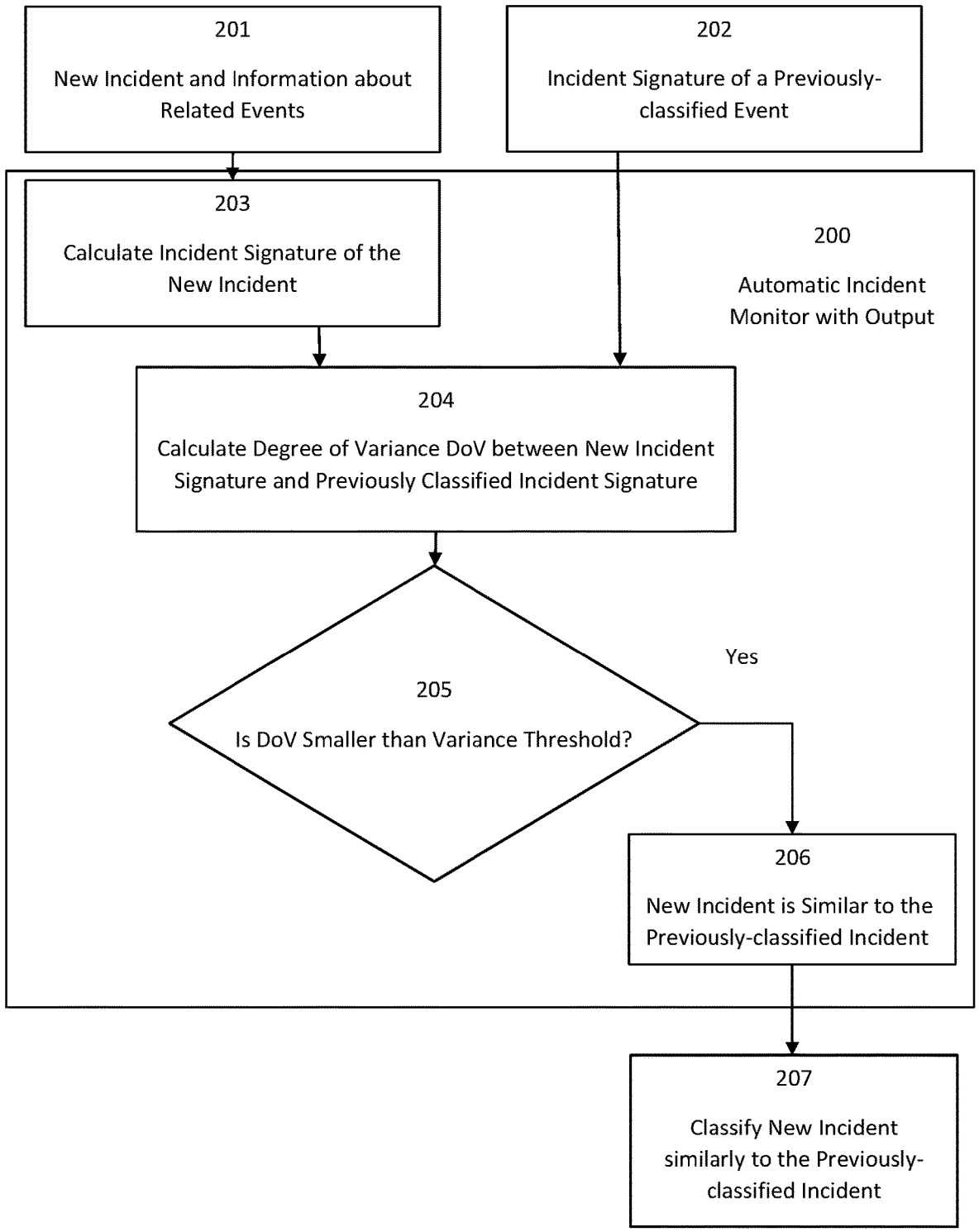
FIG. 2 shows an exemplary procedure for an operation of an automatic incident dispatcher that classifies new incident similarly to a previously classified incident according to an exemplary embodiment.

FIG. 2 shows the operation of an embodiment of the AID (200) that classifies new incidents similarly to the previously classified incident.

At some point, AID (200) receives a new incident and information about events related to the new incident (201), and further receives incident signatures of a previously classified event (202).

AID (200) calculates the incident signature of the new incident (203).

AID (200) also gains access to an incident signature of a previously classified event (202).

Once both signatures are available, AID (200) calculates (204) a degree of variance (DoV) between the new incident signature (201) and the previously classified incident signature (202).

Then, AID (200) compared the DoV to a predetermined variance threshold (205). If the DoV is smaller (or smaller or equal) than the threshold, then AID decides that the new incident is similar to the previously classified incident (206) and classifies the new incident similarly to the previously classified event (207).

Figure 3:
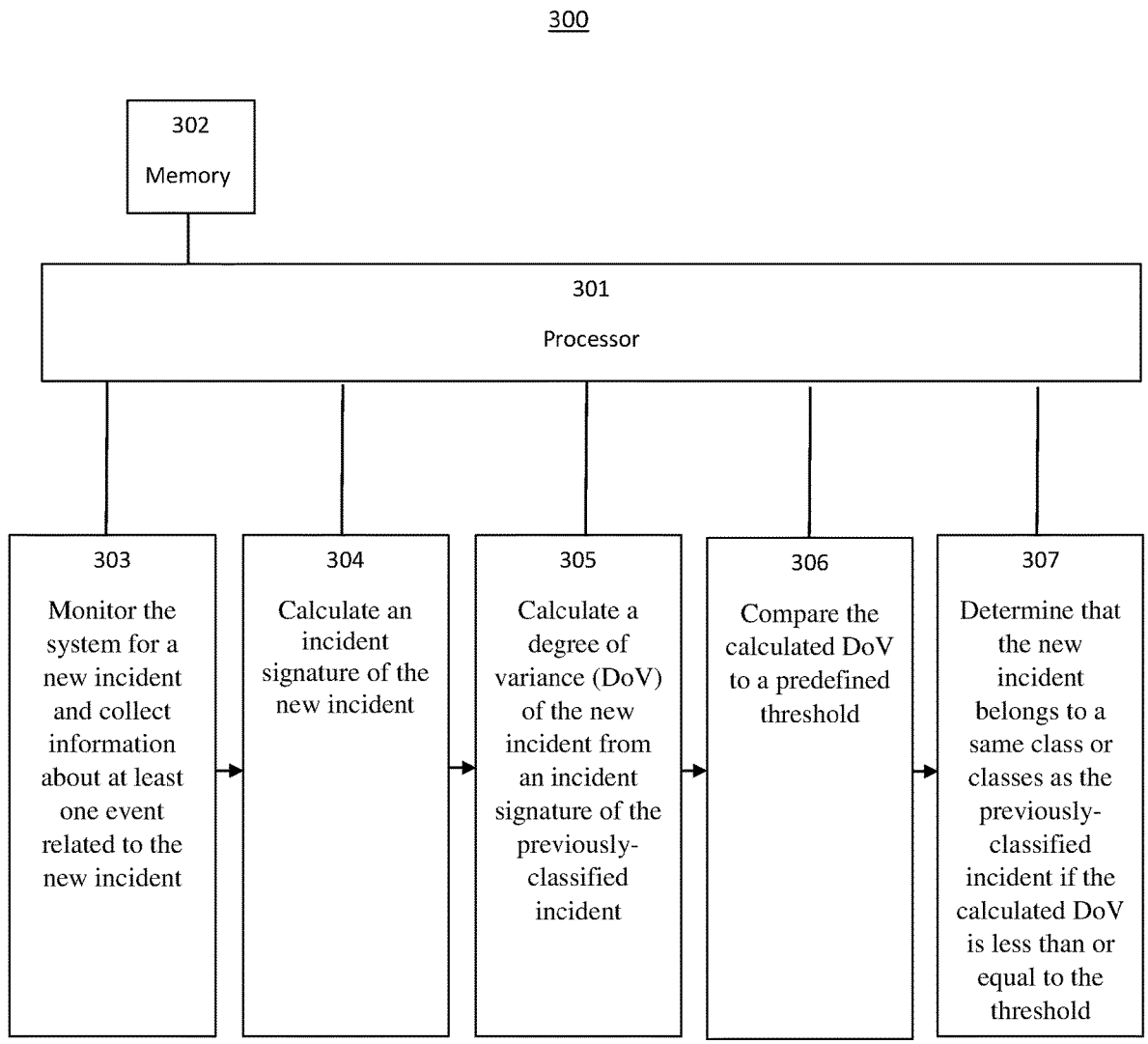
FIG. 3 shows the components and interactions of an exemplary system for an automatic incident dispatcher embodying the invention.

FIG. 3 shows an exemplary system (300) for an automatic incident dispatcher.

System (300) includes a processor (301) (e.g., Central Processing Unit (CPU)) of a computer coupled to a memory (302) that stores instructions that are implemented by the processor (301).

The processor (301) is configured to implement the instructions for system (300) for an AID with at least one class of events related to the system, and information about at least one previously classified incident to monitor (303) the system for a new incident and collect information about at least one event related to the new incident, calculate (304) an incident signature of the new incident, calculate (305) a degree of variance (DoV) of the new incident with an incident signature of the previously classified incident, compare (306) the calculated DoV to a predetermined threshold, and decide (307) whether the new incident belongs to a same class or classes as the previously classified incident if the calculated DoV is less than or equal to the threshold.

In an exemplary embodiment, in system (300), the AID classifies the new incident as unknown.

In an exemplary embodiment, in system (300), the classifying includes determining certain information, such as severity, about the new incident.

In an exemplary embodiment, in system (300), the classifying includes assigning the AID to a trouble tracking system or to a system administrator.

In an exemplary embodiment, in system (300), the AID further identifies controls related to the new incident, and applies controls related to the identified the new incident.

In an exemplary embodiment, in system (300), the AID performs analysis by applying predetermined heuristic rules, statistical analysis, a neural network, or support vector machines.

In an exemplary embodiment, in system (300), the AID classifies the new incident similarly to the previously classified incident if the calculated DoV is less than or equal to the threshold.

It is noted that some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of predetermined steps leading to a desired end state or result. In example implementations, the steps carried out require physical manipulations of tangible quantities for achieving a tangible result.

Unless specifically stated otherwise, as apparent from the discussion, it is appreciated that throughout the description, discussions utilizing terms such as "processing," "monitoring," "determining," "calculating," "comparing," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium. A computer-readable storage medium may involve tangible mediums such as, but not limited to optical disks, magnetic disks, read-only memories, random access memories, solid state devices and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the teachings of the example implementations as described herein. The instructions of the programming language(s) may be executed by one or more processing devices, e.g., central processing units (CPUs), processors, or controllers.

The individual operations described above can be performed by hardware, software, or some combination of software and hardware. Various aspects of the embodiments may be implemented using circuits and logic devices (hardware), while other aspects may be implemented using instructions stored on a machine-readable medium (software), which if executed by a processor, would cause the processor to perform a method to carry out implementations of the disclosed embodiments. Moreover, the various functions described can be performed in a single unit or can be spread across a number of components in any number of ways. If desired, the instructions can be stored on the medium in a compressed and/or encrypted format.

The invention claimed is:

1. A method for automatically detecting an incident in a computer system by reference to a database storing information about one or more previously classified incidents, the method comprising:
monitoring the computer system and collecting information about events related to a new incident;
calculating an incident signature of the monitored incident as a new incident vector of values representing events related to the incident;
calculating a degree of variance (DoV) of the incident from an incident signature of the one or more previously classified incidents, wherein the incident signature of the one or more previously classified incidents is a previous incident vector of values representing events related to the previously classified incident, and the DoV is a distance between the new incident vector and the previous incident vector;
comparing the calculated DoV to a predetermined threshold;
when the calculated DoV is less than or equal to the threshold, determining that the incident belongs to the same class as at least one previously classified incident, and further comparing the calculated DoV to a second predetermined threshold and determining that the incident belongs to the same class as at least another previously classified incident to determine all classes that apply to the incident;
when the calculated DoV is greater than the threshold, determining that the incident does not belong to the same class as at least one previously classified incident, and when the incident does not belong to the same class of any of the previously classified incidents, determining a new class by identifying a cluster of events in the new incident vector for the incident that have not been previously classified in a class;
adding the new incident to the database storing information about previously classified incidents;
determining a recommended control for the computer system including at least one corrective action on the computer system, the at least one corrective action associated with the new incident based on the class; and
executing the recommended control on the computer system to mitigate the incident.

2. The method of claim 1, wherein the new incident is classified as unknown.

3. The method of claim 1, wherein the step of determining includes determining certain information about the new incident needs to be assigned to a trouble tracking system.

4. The method of claim 1, wherein the step of determining includes determining certain information about the new incident needs to be assigned to a system administrator.

5. The method of claim 1, wherein the step of determining includes determining severity of the new incident.

6. The method of claim 1, further comprising the step of performing analysis by applying predetermined heuristic rules, statistical analysis, a neural network, or support vector machines.

7. The method of claim 1, wherein the calculated DOV is less than the threshold.

8. The method of claim 1, further comprising the step of classifying the new incident similarly to the previously classified incident if the calculated DoV is less than or equal to the threshold.

9. A system for automatic incident detection in a computer system, the system comprising:
a database storing information about one or more previously classified incidents;
a processor in communication with the database coupled to a memory storing instructions, the processor being configured to implement the instructions for an automatic incident dispatcher (AID) with at least one class of events related to the computer system, and information about at least one previously classified incident, to:
monitor the computer system for an incident and collect information about at least one event related to the new incident;
calculate an incident signature of the incident as a new incident vector of values representing events related to the incident;
calculate a degree of variance (DoV) of the incident from an incident signature of the one or more previously classified incidents, wherein the incident signature of the one or more previously classified incidents is a previous incident vector of values representing events related to the previously classified incident, and the DoV is a distance between the new incident vector and the previous incident vector;
compare the calculated DoV to a predetermined threshold;
when the calculated DoV is less than or equal to the threshold, determine that the new incident belongs to a same class as a class of the previously classified incident, and further compare the calculated DoV to a second predetermined threshold and determine that the incident belongs to the same class as at least another previously classified incident to determine all classes that apply to the incident;
when the calculated DoV is greater than the threshold, determine that the incident does not belong to the same class as at least one previously classified incident, and when the incident does not belong to the same class of any of the previously classified incidents, determine a new class by identifying a cluster of events in the new incident vector for the incident that have not been previously classified in a class;
add the incident to the database storing information about previously classified incidents;
determine a recommended control for the computer system including at least one corrective action on the computer system, the at least one corrective action associated with the new incident based on the class; and
execute the recommended control on the computer system to mitigate the incident.

10. The system of claim 9, wherein the AID classifies the new incident as unknown.

11. The system of claim 10, wherein the classifying includes determining certain information about the new incident.

12. The system of claim 10, wherein the classifying includes assigning the AID to a trouble tracking system.

13. The system of claim 10, wherein the classifying includes assigning the AID to a system administrator.

14. The system of claim 9, wherein the AID performs analysis by applying pre-programmed heuristic rules, statistical analysis, a neural network, or support vector machines.

15. The system of claim 9, wherein the calculated DOV is less than the threshold.

16. The system of claim 9, wherein the AID classifies the new incident similarly to the previously classified incident if the calculated DoV is less than or equal to the threshold.

\* \* \* \* \*